United States Patent
Banno

(10) Patent No.: US 9,478,041 B2
(45) Date of Patent: Oct. 25, 2016

(54) MOVING OBJECT DETECTION METHOD

(71) Applicant: IHI Corporation, Koto-ku (JP)

(72) Inventor: Hajime Banno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/638,710

(22) Filed: Mar. 4, 2015

(65) Prior Publication Data

US 2015/0178940 A1    Jun. 25, 2015

Related U.S. Application Data

(63) Continuation of application No. PCT/JP2013/073940, filed on Sep. 5, 2013.

(30) Foreign Application Priority Data

Sep. 7, 2012 (JP) ................. 2012-197529

(51) Int. Cl.
| | | |
|---|---|---|
| G06K 9/00 | (2006.01) | |
| G06T 7/20 | (2006.01) | |
| B64G 3/00 | (2006.01) | |
| G06T 7/00 | (2006.01) | |

(52) U.S. Cl.
CPC ................ *G06T 7/204* (2013.01); *B64G 3/00* (2013.01); *G06T 7/0044* (2013.01); *G06T 7/0048* (2013.01); *G06T 7/2006* (2013.01); *G06T 7/2053* (2013.01); *G06T 2207/10032* (2013.01); *G06T 2207/20076* (2013.01); *G06T 2207/20148* (2013.01); *G06T 2207/30181* (2013.01); *G06T 2207/30241* (2013.01)

(58) Field of Classification Search
None
See application file for complete search history.

(56) References Cited

U.S. PATENT DOCUMENTS

2006/0103742 A1* 5/2006 Kubo ............... H04N 5/2178
348/241

FOREIGN PATENT DOCUMENTS

| JP | 2000-025700 A | 1/2000 |
|---|---|---|
| JP | 2002-139319 A | 5/2002 |
| JP | 2002-220098 A | 8/2002 |
| JP | 2002-220099 A | 8/2002 |
| JP | 2002-310616 A | 10/2002 |
| JP | 2003-323625 A | 11/2003 |

OTHER PUBLICATIONS

International Search Report mailed Oct. 8, 2013 for PCT/JP2013/073940 filed Sep. 5, 2013 with English Translation.

(Continued)

*Primary Examiner* — Stephen R Koziol
*Assistant Examiner* — Amandeep Saini
(74) *Attorney, Agent, or Firm* — Oblon, McClelland, Maier & Neustadt, L.L.P.

(57) ABSTRACT

A moving object detection method according to an embodiment includes evaluating an average value, instead of a median value, of pixel values at the same pixel positions across multiple superposed images. A threshold value obtained by multiplying the average value by a predetermined number is employed to distinguish space debris from an object which emits light at a higher luminance than the space debris. In order to detect the space debris accurately, an average value of the pixel values that are equal to or less than the threshold is employed as an evaluation value for the space debris detection.

9 Claims, 9 Drawing Sheets

(56) References Cited

OTHER PUBLICATIONS

Extended European Search Report issued Jul. 13, 2016 in European Patent Application No. 13834866.9.
Toshifumi Yanagisawa et al., "Automatic Detection Algorithm for Small Moving Objects," Publ. Astron. Soc. Japan 57, pp. 399-408, Apr. 25, 2005.
Vladimir Kouprianov, "Advanced Image Processing Techniques for Automatic Reduction of GEO Survey Data," Central Astronomical Observatory of Russian Academy of Sciences, 14 pp.
Myrtille Laas-Bourez et al., "A new algorithm for optical observations of space debris with the TAROT telescopes," Advances in Space Research 44, pp. 1270-1278, Jun. 15, 2009.
Carolin Früh, "Identification of Space Debris," Inauguraldissertation der Philosophisch-Naturwissenschaftlichen Fakultat der Universitat Bern, 225 pp., Sep. 22, 2011.
Peter W. Draper et al., "CCDPACK-CCD data reduction package, Version 4.0, Users' Manual," Starlink Project, SUN/139.18, 298 pp., Jul. 7, 2011.

* cited by examiner

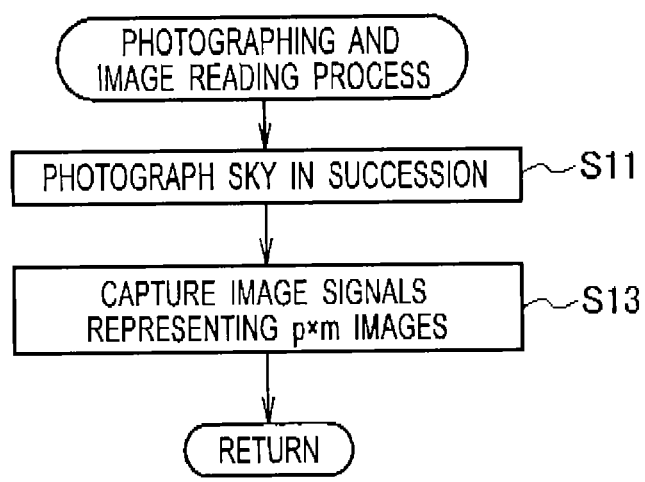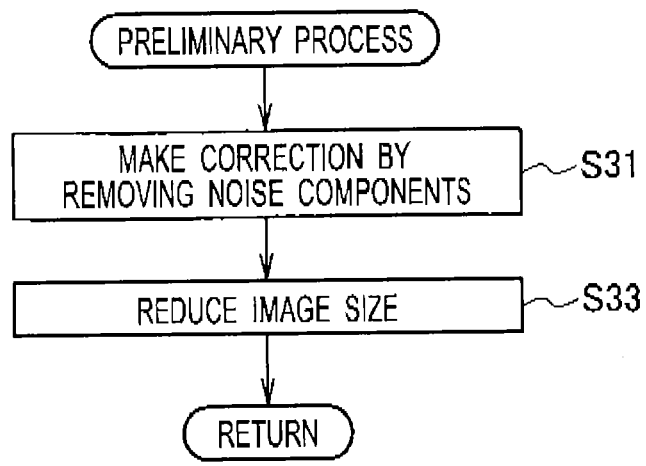

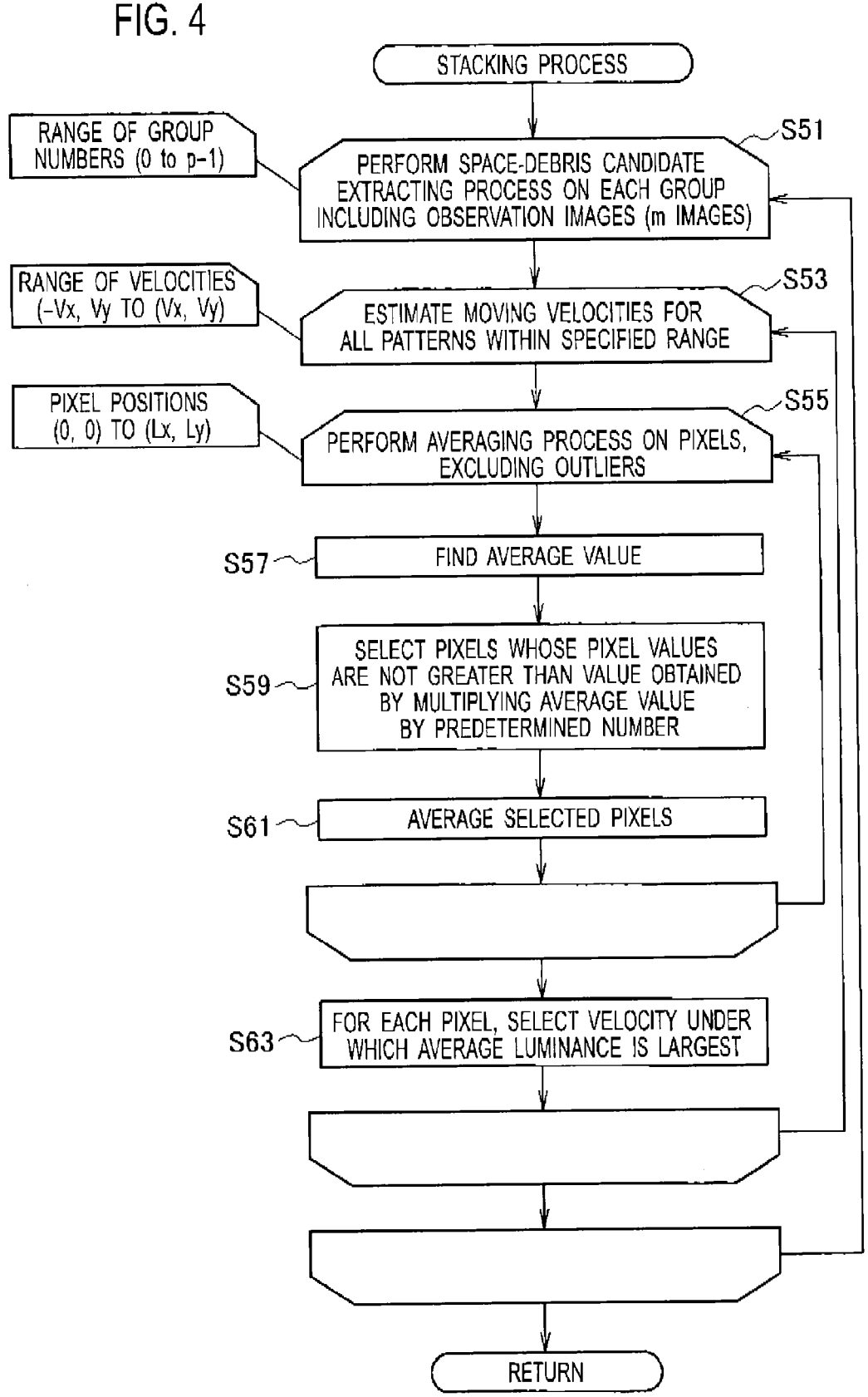

MOVING OBJECT DETECTION METHOD

CROSS REFERENCE TO RELATED APPLICATION

The present application is a continuation application of International Application No. PCT/JP2013/073940, filed Sep. 5, 2013, which claims priority to Japanese Patent Application No. 2012-197529, filed Sep. 7, 2012. The contents of these applications are incorporated herein by reference in their entirety.

BACKGROUND OF THE INVENTION

1. Field of the Invention

The present invention relates to a method of detecting a moving object from captured images.

2. Description of the Related Art

Space debris is an out-of-service artificial object which orbits the Earth. A detection of the existence of the space debris is important for smooth operation of spacecraft (artificial satellites, space stations, space shuttles and the like). One method among conventional space debris detection methods determines the existence of space debris by extracting high-luminance parts respectively from images captured by a CCD (charge coupled device) camera on the Earth or on the orbit.

This method includes: cropping areas in the same size from three or more images captured at time intervals in accordance with the movement of a moving object such as space debris; and applying a stacking method to the cropped image areas. Here, the movement of the moving object is the uniform motion or the like having mobile vectors (velocities) in a two-dimensional direction in the xy-coordinate system, for example. To put it concretely, the cropped image areas are superposed on one another, and a median value is evaluated from pixel values at the same pixels across the superposed image areas. If the median value thus evaluated is equal to or greater than a predetermined value, the pixel is extracted as a pixel representing the existence of the moving object (see Japanese Patent Application Laid-open Publications Nos. 2002-139319 and 2003-323625, for example).

The stacking method is a widely-used effective method not only for detecting space debris, but also for detecting a moving object at a low luminance level in an image. Furthermore, as described above, the stacking method employs the median pixel value as the evaluation value for the moving object detection. Therefore, the stacking method causes no rise in the evaluation value even if a noise component happens to be captured in some of the images (for example, a star or a cosmic ray in the cosmos is captured in some of the images), in contrast to another case in which an average pixel value is used as the evaluation value. For this reason, the stacking method is advantageous in inhibiting erroneous detection of a moving object due to the existence of a star or a cosmic ray which happens to be captured therein.

SUMMARY OP THE INVENTION

As described above, when the moving object is detected from the multiple images captured at time intervals using the stacking method, it is required to superpose the areas to be cropped from the respective images in a staggered manner by the amount of movement of the moving object in each image-photographing (image-capturing) interval so that objects captured in the images, which correspond to the detection object, are overlapped one another. However, as is often the case with space debris, for example, nothing is known about the movement (the vector direction and the scalar quantity) of the moving object in advance.

For this reason, areas suitable to be cropped from the images, which allow pictures of the space debris as the detection object to be superposed on one another in the staggered manner, have to be evaluated by trial and error, i.e. by cropping candidate areas from the respective images and superposing the candidate areas in a staggering manner both in various directions and by various amount. Such trial and error requires an enormous amount of processing work.

Let us assume, for example, a case where a moving object is detected from n images each with an image size L=(Lx, Ly) by the aforementioned stacking method. Here, it is supposed that the x- and y-axis direction components of the moving velocity V which are given by V=(±Vx, ±Vy) when the moving velocity V of the moving object is expressed using a distance that the moving object moves in a time period corresponding to the overlaps between the pictures of the moving object. In this respect, let us further assume a case where a value of the velocity V and a value of the image size L are given by Vx=Vy=200 (i.e., V=(±200, ±200) and Lx=Ly=2000, respectively, when the moving velocity V and the image size L are expressed using the number of pixels; and the number of images to be used for the detection is given by n=32.

When the distance that the moving object moves in the time period corresponding to the overlaps is calculated by changing and superposing the pixels on a one-to-one basis, $(\pm Vx) \times (\pm Vy)$ velocities V can be supposed for the moving object. As a result, when evaluating the pixel values at the respective (Lx×Ly) pixels for all the imagined velocities, the number of needed operation processes amounts to $$(2Vx) \times (2Vy) \times (Lx) \times (Ly)$$

$$=400 \times 400 \times 2000 \times 2000 = 6.4 \times 10^{11}.$$

These calculation processes are needed for each of the n images. Accordingly, when all the pixel values in all the pictures are evaluated, the total number of needed calculation processes is given by multiplying the above-mentioned number by 32, resulting in roughly $2.0 \times 10^{13}$.

Furthermore, the processing of evaluating a median value from pixel values at the same pixel positions across the n images needs to include: an arithmetic process of sorting the n pixel values; and a process of selecting a value lying at the middle point in a series of the pixel values arranged in an ascending (or descending) order as a result of the sorting. For this reason, the time needed for the calculation depends on the calculation needed for the sorting, and equals to the time needed to perform $$n \log(n)$$

comparison processes and assignment operations. Even in a case requiring the smallest amount of processes without sorting the values as a result of the comparison processes, the number of operations needed for the comparison processes and the assignment operations is log(n) times the number (n) of operations to be performed to evaluate a simple average pixel value. In usual cases, the values as a result of a comparison operation need to be sorted, and three assignment operations are additionally needed each time the values are sorted. For this reason, the number of operations needed for this processing is several times larger. This makes the processing become a heavily time-consuming task.

Furthermore, for a comparison operation for sorting the n pixel values, the processor performs a speculative execution after a comparison process. That is, after comparing a pair of pixel values selected from the n pixel values, the processor performs a speculative execution of "changing the order of the two pixel values" depending on the result of the comparison, or a speculative execution of "not changing the order of the two pixel values."

In this respect, let us assume a case where for a pair of pixel values, the processor performs the speculative execution of "changing the order of the two pixel values." If the pixel values, as the object of the speculative execution, happen to be arranged in an ascending or descending order, reverse to an order in which the processor sorts the two pixel values, the speculative execution performed by the processor is a success.

However, if from the beginning, the pixel values, as the object of the speculative execution, are arranged in an order in which the pixel values should be sorted, the speculative execution performed by the processor is a failure because: the processes following the speculative execution have to be suspended; the preceding work (the work based on the wrong result) has to be undone; and the preceding processes have to be resumed.

As is often the case, the speculative execution is performed on the assumption that a branch which is the same as that as a result of the previous execution will take place, and in a way that the process following the speculative execution is carried out by determining the contents of the execution before the conditions are settled. However, because the pixel values are arranged in a random order, there is a 50% probability that the result of the previous comparison is followed by the same result. For this reason, there is a 50% probability that the speculative execution performed by the processor ends in failure. Accordingly, there is a 50% probability that until work is resumed by undoing the previously-done work based on the wrong result, the work has to be suspended for a time length which is 10 to 20 times longer than the time length needed to perform the four basic arithmetic operations.

As described above, the method using the median value of the pixel values at the same pixel positions across the n images as the evaluation value for detecting the moving object is greatly advantageous in improving the detection accuracy, as compared with the method using the average value. In exchange for this advantage, the processor has to perform an enormous amount of arithmetic processing in order to evaluate the median value, as compared with evaluating the average value.

The present invention has been made with the foregoing situation taken into consideration. An object of the present invention is to provide a moving object detection method using a stacking method, the moving object detection method being capable of accurately detecting a moving object or a candidate therefore with less operation processes than required when a median value evaluated from pixel values at the same pixel position across the respective superposed images is used as an evaluation value for the moving object detection.

An aspect of the present invention provides a method (a moving object detection method) for detecting a moving object being an observation object from images captured in constant intervals, based on an evaluation value obtained from pixel values at the same pixel positions overlapping one another across the images by sequentially moving the images in accordance with a content corresponding to an estimated movement content of the moving object being the observation object during the constant intervals. Here, the method includes: an average-value-of-limited-pixels calculating step of calculating an average value using pixel values which are equal to or less than a threshold value for distinguishing the moving object being the observation object from a light emitting element with a higher luminance than that of the moving object, the pixel values being among the pixel values at the same pixel positions across the images; and a judgment step of judging pixels at the same pixel positions across images, whose average values calculated in the average-value-of-limited-pixels calculating step are equal to or greater than a criterion value, as pixels capturing the moving object being the observation object, or capturing candidates for the moving object.

The method may further include: an average-value-of-all-pixels calculating step of calculating an average value of all the pixel values at the same pixel positions across the images; and a threshold value calculating step of calculating the threshold value by multiplying the average value calculated in the average-value-of-all-pixels calculating step by a predetermined number.

The estimated movement content may be uniform linear motion of the moving object being as observation object in an estimated movement direction thereof and with an estimated movement amount thereof. The moving object as the observation object may be detected from the images based on the evaluation value obtained from the pixel values at the same pixel positions overlapping one another across the images by sequentially moving the images by parallel displacement in the estimated movement direction of and with the estimated movement amount of the moving object being the observation object.

The estimated movement content may be uniform acceleration motion of the moving object being the observation object in an estimated movement direction thereof and with an estimated movement amount thereof which increases or decreases by a constant amount over time. The moving object being the observation object may be detected from the images based on the evaluation value obtained from the pixel values at the same pixel positions overlapping one another across the images by sequentially moving the images by parallel displacement in the estimated movement direction of and with the estimated movement amount of the moving object being the observation object.

The method may further include: a grouping step of dividing the images into groups each including a predetermined number of successive images in time series; and a detection step of detecting the moving object being the observation object in the images based on a result of the judgment in the judgment step. Here, for each of the groups into which the images are divided in the grouping step, the average-value-Of-limited-pixels calculating step and the judgment step may be performed using the predetermined number of images belonging to the group. If the candidates coinciding with one another in terms of the estimated movement content and movement locus are extracted from the groups, the detection step may detect the candidates as the moving object being the observation object in the images.

The method may further include a filtering step of : moving one image of the images, and another image captured before or after the one image in one of the constant intervals, in accordance with a content corresponding to an already-known movement content of a moving object, which is different from the observation object, during the constant intervals; subtracting pixel values at the same pixel positions in the other image overlapping the one image from pixel values of the pixels in the one image; and thereby calculating post-filtering pixel values for the pixels in the one image. Here, the average-value-of-limited-pixels calculating step may calculate an average value of pixel values equal to or less than the threshold value, the pixel values being among the post-filtering pixel values at the same pixel positions across the images obtained in the filtering step.

The moving object being the observation object may be an object orbiting the earth. The images may be images captured in intervals during fixed-point observation.

When a moving object is detected using a stacking method, the present invention makes it possible to accurately detect the moving object or the candidate therefore with less operation processes than required when a median value evaluated from pixel values at the same pixel positions across the respective superposed images is used as an evaluation value for the moving object detection.

BRIEF DESCRIPTION OF THE DRAWINGS

FIG. 2 is a flowchart showing a concrete procedure for a photographing (capturing) and image reading process step in the flowchart shown in FIG. 1.

FIG. 3 is a flowchart showing a concrete procedure for a preliminary process step in the flowchart shown in FIG. 1.

FIG. 4 is a flowchart showing a concrete procedure for a stacking process step in the flowchart shown in FIG. 1.

DESCRIPTION OF THE PREFERRED EMBODIMENTS

Figure 1:
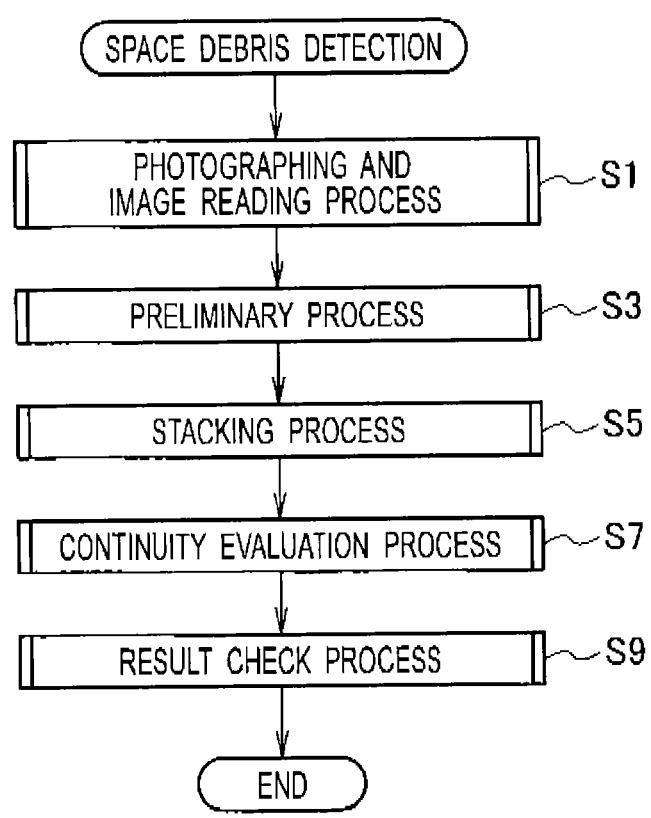
FIG. 1 is a flowchart showing a procedure in the case where a moving object detection method of the present invention is applied to detection of space debris from photographed celestial images.

Referring to the drawings, descriptions will be provided for an embodiment in which a moving object detection method of the present invention is applied to detection of space debris from photographed celestial images.

The moving object detection method of the embodiment is designed to detect space debris as a moving object being an observation object from the photographed celestial images. A described in a flowchart of FIG. 1, this method is designed to perform a photographing (capturing) and image reading process step (step S1), a preliminary process step (step S3), a stacking process step (step S5), a continuity evaluation process step (step S7) and a result check process step (step S9).

As shown in the flowchart of FIG. 2, the photographing and image reading process step (step S1 in FIG. 1) begins with repeatedly making a series of photographs of a space (the sky), including the geostationary orbit of space debris, for a predetermined length of exposure time at constant time intervals (step S11). Subsequently, the image reading process step (step S1 of FIG. 1) ends with capturing image signals representing the captured images (step S13).

A photographing (capturing) apparatus (not illustrated) formed by connecting a CCD camera to an astronomical telescope, for example, may be used for taking the images of the sky. Furthermore, in the embodiment, the below-described stacking process step (step S5 in FIG. 1) is carried out p times, each time by using m images. In other words, the p×m images are photographed in succession by, and captured into the photographing apparatus.

Thereafter, as shown in the flowchart of FIG. 3, the preliminary process step (step S3 in FIG. 1) begins with making corrections to the image signals, captured from the photographing apparatus (not illustrated), by removing noise components included in the image signals (step S31) Afterward, the size of images representing the corrected image signals is reduced to an image size to be handled in the below-described stacking process step (step S5 in FIG. 5) (step S33). In the embodiment, the size of the images is reduced to a half in both the vertical and horizontal directions (to a quarter in terms of the area). Then, the largest pixel value in the 2×2 pixels before the reduction is assigned as a pixel value to one pixel after the reduction. Hence, the preliminary process step (step S3 in FIG. 1) is terminated.

In step S31, the corrections are made by removing the noise components. Specifically, the corrections are achieved by removing the noise components included in the signals representing the images captured by the photographing apparatus (not illustrated). A typical example of the noise components to be removed is an offset component of a CCD element in the CCD camera in the photographing apparatus.

The offset component of the CCD element is a noise component which occurs when an image of a photographic object captured by the astronomical telescope of the photographing apparatus (not illustrated) is converted into an electric signal by the CCD element in the CCD camera. To put it concretely, when an output has to correspond to a zero luminance (i.e., when the quantity of light from the photographic object is at zero), the CCD element may, in some cases, shift (offset) an actual output from the point zero. Furthermore, the contents of the offset vary from one CCD element to another.

As a measure to counter this, when an object at a zero luminance is photographed, the offset component of the CCD element is corrected (i.e., subjected to offset correction) in order that the image signal outputted from the photographing apparatus becomes "0." Incidentally, the offset correction of this case is termed as dark correction. The correction value can be obtained by evaluating a value of the output from the CCD element at the time of photographing while blocking the light receiving unit from light.

Subsequently, the correction value thus evaluated is subtracted from the pixel value at each of the pixels which corresponds to an image of the sky photographed by the photographing apparatus for the moving object detection. This makes it possible to correct the offset component of the CCD element.

Another typical example of the noise components to be removed from the image signals in step S31 is a noise component attributed to a star. The noise component attributed to the star occurs when the star existing in the sky is captured into the images with the star and its surrounding area expressed as blurred dots or lines in accordance with the moving velocity of the star.

The noise component attributed to the star can be eliminated from each image by subtracting the pixel values at the same pixel positions in two images that are overlapped each other by parallel displacement with the already-known amount of movement of the star in the already-known movement direction of the star. Here, one of the two images is an image captured by the photographing apparatus (not illustrated), and another image is its preceding or following image captured in succession by the photographing apparatus.

To this end, the noise component of the image signals attributed to the star is eliminated after the dark correction to the offset component of the CCD element by: superposing each two successive images of the sky captured by the photographing apparatus for the moving object detection by moving the two successive images by parallel displacement in accordance with the direction and amount of the movement of the star; and subtracting the pixel values at the pixels overlapping each other. The foregoing may be employed as the contents of the correction to be made by removing the noise components in step S31 of FIG. 3.

As shown in the flowchart of FIG. 4, the stacking process step (step S5 in FIG. 1) begins with; dividing the p×m images (whose image size is L=(Lx, Ly)), photographed in succession by the photographing apparatus (not illustrated) at the constant time intervals, into p groups (sets) each including the successive m images; and for each group (p=0 to p−1), subjecting the m images to the stacking method, and thereby extracting the candidate for the space debris (step S51).

The process of extracting the candidate for the space debris from the m images is achieved by performing calculation using the pixel values at the same pixel positions overlapping one another while, by parallel displacement, sequentially moving each image by its estimated moving velocity of the space debris (i.e., a length (distance or interval) of the movement of the space debris on the image at its estimated moving velocity within a predetermined time length). Sequentially changing the estimated moving velocity of the space debris in a range of (−Vx/p, −Vy/p) to (Vx/p, Vy/p), this calculation is performed on each estimated moving velocity (step S53). In this respect, the reason why the range of the estimated moving velocity is 1/p is that: the time length is 1/p; and the distance of the movement within the entire time length is also 1/p.

Furthermore, the calculation using the pixel values at the same pixel positions overlapping one another across the m images is performed for each of pixel positions (whose pixel coordinates are (0, 0) to (Lx, Ly)) of each image. To put it concretely, an averaging process is performed on the pixel values of the pixels, excluding the pixel values of pixels (outliers) not satisfying a condition, at the same pixel positions overlapping one another across the m images which are sequentially moved by parallel displacement by the estimated moving velocity V of the space debris (step S55). In this respect, the condition means "being less than a threshold value obtained by multiplying the average value of the pixels values of the pixels by a predetermined number."

The threshold value is used to distinguish the space debris from an object which emits light at a higher luminance than the space debris (corresponding to a high-luminance light emitting element in the CLAIMS). What value the threshold value should be set at is a very important parameter for a value calculated by the following process to reflect less of the luminance (pixel value) of a moving object whose luminance (pixel value) greatly differs from the luminance of the space debris.

For this reason, the threshold value is set based on the average value of all the pixel values, except an outlier pixel value, at the same pixel positions across the superposed images (by multiplying the average value of all the pixel values, except the outlier pixel value, by the predetermined number). The employment of the threshold value as a criterion for the luminance (pixel value) of the space debris makes it possible to accurately distinguish a pixel whose luminance (pixel value) greatly differs from the criterion luminance (pixel value), as a pixel representing the existence of a light emitting object which is not the space debris, from a pixel representing the existence of the space debris.

Meanwhile, the above-mentioned "predetermined number" that dominates the threshold value can be set at an appropriate value using a statistical method. The predetermined value may be set in a range of 1.5 to 3, for example. The following descriptions will be provided for the embodiment in which the predetermined number is set at 2.

First of all, the m images belonging to one group (p=0 to p−1) set in step S51 are sequentially moved by parallel displacement by the estimated moving velocity (one of (−vx/p, −Vy/p) to (Vx/p, Vy/p)) of the space debris set in step S53. Subsequently, an average value of the pixel values at the same object pixel positions ((0, 0) to (Lx, Ly)) overlapping one another across the superposed images set in step S55 is evaluated (step S57).

Thereafter, using the threshold value obtained by multiplying the evaluated average value by two (the predetermined number), pixels whose pixel values are equal to or less than the threshold value are selected (step S59). An average value of the pixel values of the selected pixels is calculated (step S61). It should be noted that the average value calculation in step S61 is judged as being impossible if the proportion of pixels whose pixel values are equal to or less than 0.5 times the average value evaluated in step S57 to all the pixels exceeds 50%.

Figure 5:
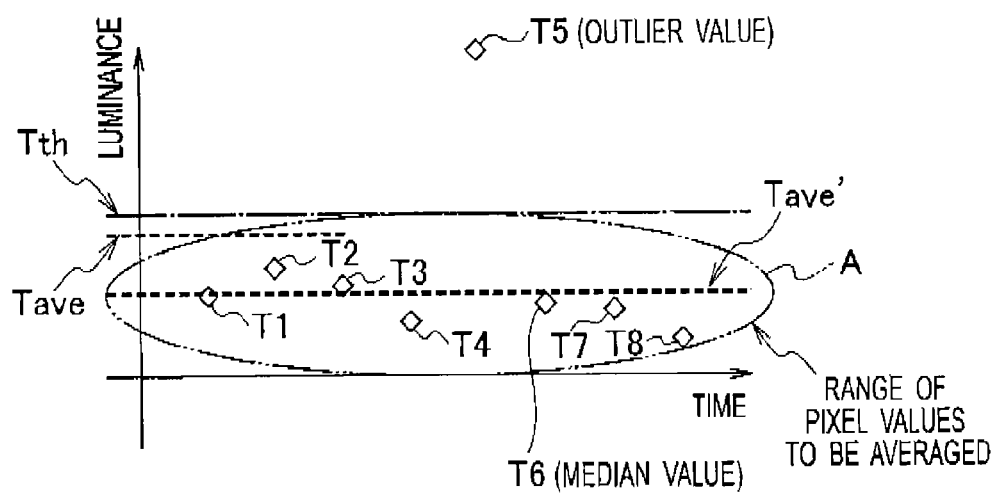
FIG. 5 is a graph showing characteristics of an average value to be calculated using pixel values equal to or less than a threshold value in the preliminary process step shown in FIG. 1.

The average value calculated using the foregoing procedure in step S61 is described in a graph of FIG. 5. First of all, diamonds plotted on the graph of FIG. 5 represent pixel values (luminances) T1 to T0 at the same object pixel positions where the objects on the images are overlapped one another in the superposed state. Here, the horizontal axis in FIG. 5 represents times at which images including the images corresponding to the plotted pixel values T1 to T8 are photographed, while the vertical axis in FIG. 5 represents luminances corresponding to pixel values.

A simple average value Tave of the pixel values T1 to T8 at the same pixel positions across the images is represented by a thin dashed line in FIG. 5. In addition, the threshold value Tth obtained by multiplying the simple average value Tave by the predetermined number is represented by a chain line in FIG. 5. Furthermore, an average value Tave' of the pixel values T1 to T4, TG to Ts belonging to a range A of pixel values, which are equal to or less than the threshold value Tth and are objects to be averaged, is represented by a thick dashed line in FIG. 5. The average value Tave' is that which is calculated in step S61, and is much closer to the pixel value T6, the median value, than is the simple average value Tave of the pixel values T1 to T8.

Thereafter, the calculation using the pixel values at the same pixel positions overlapping one another across the superposed m images is performed on each of the pixel positions (whose pixel coordinates are (0, 0) to (Lx, Ly)) (step S55 to step S61). Thereafter, each time the estimated moving velocity V of the space debris used to sequentially move the m images by parallel displacement is changed from one to another in a range of (−Vx/p, −Vy/p) to (Vx/p, Vy/p) (step S53), an estimated moving velocity V under which the average value evaluated in step S61 is the largest is selected (or updated) (step S63).

Furthermore, once the estimated moving velocity V under which the average value evaluated in step S61 is the largest is selected (or updated) based on the average values which are evaluated in step S61 for all the estimated moving velocities V (V=(−Vx/p, −Vy/p) to (Vx/p, Vy/p)) (step S53 to S63), the forgoing processes are executed for all the remaining groups (p=0 to p−1).

Once the foregoing processes are completed for all the groups (p=0 to p−1) (steps S51 to S63), the stacking process step (step S5 in FIG. 1) is terminated.

Next, as shown in a flowchart of Pig. 6, the continuity evaluation process step (step S7 in FIG. 1) begins with detecting pixels whose pixel values are equal to or greater than a threshold value (a candidate criterion value, corresponding to a criterion value in the CLAIMS) required for determining a candidate for the space debris, as candidate points for the space debris (step S71). It should be noted that these pixels also represent the pixels, with which the average value of their pixel values evaluated in step S61 based on the estimated moving velocity V selected in step S63 becomes the largest.

Subsequently, two arbitrary groups (q, r ∈[1, p]) are selected from the p groups (step S73). For each group q, r, it is calculated as to which pixel in each image the candidate for the space debris detected in step S71 passes through at common predetermined time (step S75).

Figure 7:
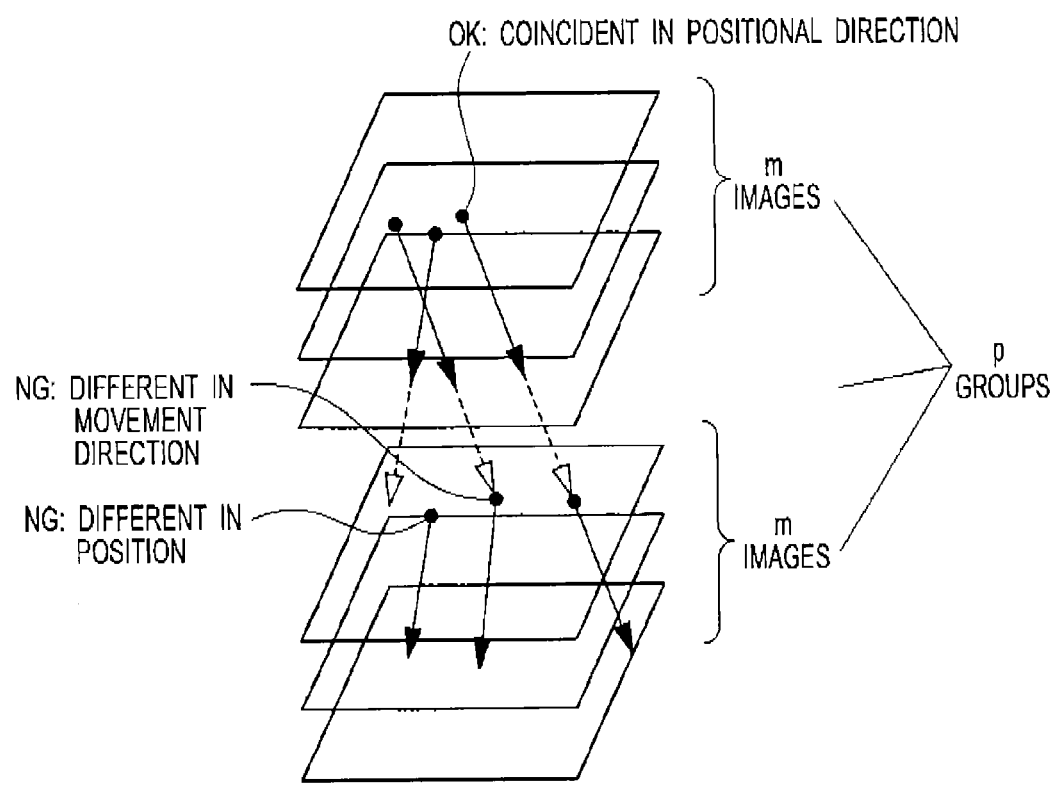
FIG. 7 is an explanatory diagram schematically showing contents of the procedure for the continuity evaluation process step shown in FIG. 6.

Thereafter, pairs each consisting of a candidate for the space debris from the group q and a candidate for the space debris from the group r, which pass through the same pixel positions (or alternatively, adjacent pixel positions within given ranges) at the predetermined time, are extracted (step S77). For example, a schematic diagram in FIG. 7 shows that, of three candidate points for the space debris captured in an uppermost image in the lower group in the diagram, two are situated on extension lines from the loci of the movement of two of three candidate points for the space debris captured in each image of in the upper group in the diagram. For this reason, the two candidate points correspond to the pair passing through the same pixel positions at the predetermined time.

Subsequently, from the pairs of candidates for the space debris extracted in step S77 (see FIG. 6), a pair of candidates for the space debris whose estimated moving velocities V in the respective groups q, r are close to each other (i.e., fall within a given error range) are extracted as final candidates for the space debris (step S79). For example, a schematic diagram in FIG. 7 shows that: the candidate points for the space debris marked with "OK: coincident in positional direction" are in the same positional direction in both the upper and lower groups in the diagram. For this reason, this pair corresponds to a pair sharing the same estimated moving velocity V inclusive of the directional components.

On the other hand, the candidate points for the space debris marked with "NG: different in movement direction" are different from each other in the movement direction between the upper and lower groups in the diagram. For this reason, this pair does not correspond to the pair sharing the same estimated moving velocity v inclusive of the directional components.

Furthermore, the candidate points for the space debris marked with "NG: different in position" are in the same movement direction in both the upper and lower groups in the diagram. However, the candidate point for the space debris captured in the uppermost image in the lower group in the diagram is not situated on the extension line from the movement locus of the candidate point for the space debris captured in the images in the upper group in the diagram. For this reason, this pair does not correspond to the pair passing through the same pixel position at the predetermined time.

In addition, estimated luminances c of the candidates for the space debris from the groups q, r extracted in step S77 are calculated in step S79. As for the pair of candidates for the space debris extracted in step S79 as the final candidates for the space debris, the estimated luminances c of the corresponding candidates for the space debris from the groups q, r are calculated using an equation $c=\sqrt{(a \times b)}$, where a and b denote the maximum average pixel values (selected in step S63 of FIG. 4) concerning the candidate points, respectively. As for the other pairs of candidates for the space debris in the groups q, r, which are not extracted as the final candidates for the space debris, their estimated luminances c are set at c=0.

Once the final candidates of the space debris are extracted from the respective groups q, r and their luminances c are calculated (step S73 to step S79), final candidates for the space debris are extracted from another pair of groups, and their luminances c are calculated. In this respect, for example, if the number of groups p is three, the final candidates for the space debris are extracted from Groups 1, 2, and from Group 2, 3; and their luminances c are calculated. Here, the final candidates for the space debris may further be extracted from Groups 1, 3, and their luminances c may be calculated as well. The continuity evaluation process step (step 7 in FIG. 1) is hence terminated.

Figure 8:
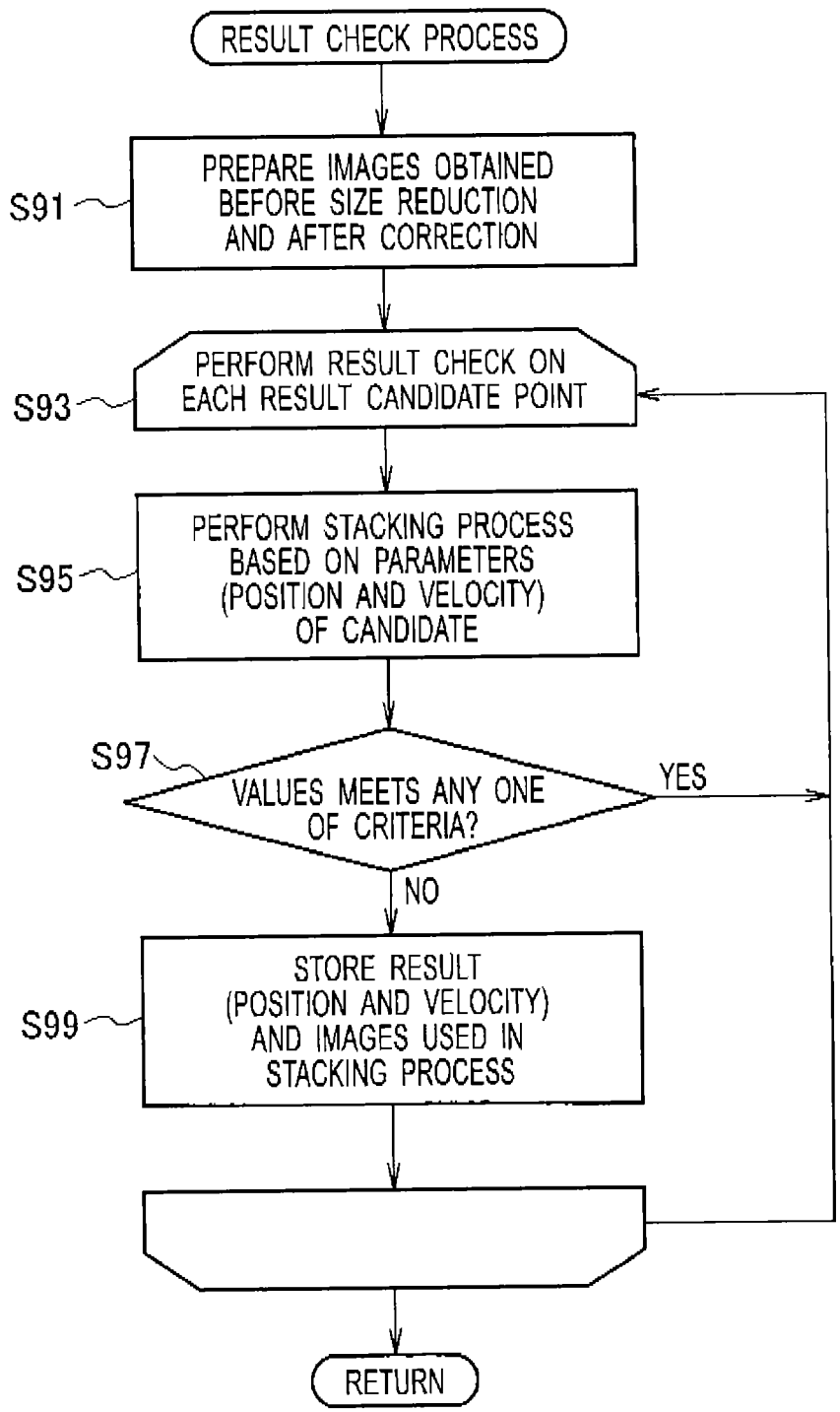
FIG. 8 is a flowchart showing a concrete procedure for a result check process step in the flowchart shown in FIG. 1.

As shown in a flowchart in FIG. 8, in the result check process step shown as step S9 in FIG. 1, for all the pairs extracted in step S77 as the final candidates for the space debris, the m images before the size reduction in step S33 of FIG. 3 but after the correction in step S31 of FIG. 3 are firstly prepared from each of the groups to which the pairs belong (step S91). Subsequently, using the thus-prepared images, each final candidate is checked on whether or not it should be detected as the space debris (step S93).

For this check process, the stacking process to be performed in the stacking process step in step S5 of FIG. 5 is performed on the final candidate for the space debris by use of the images before the size reduction which are prepared in step S91 (step S95). In this process, the pixel value of the candidate for the space debris from each of the groups corresponding to the final pair of candidates for the space debris is set at the estimated luminance c calculated in step S79 of FIG. 6.

Figure 6:
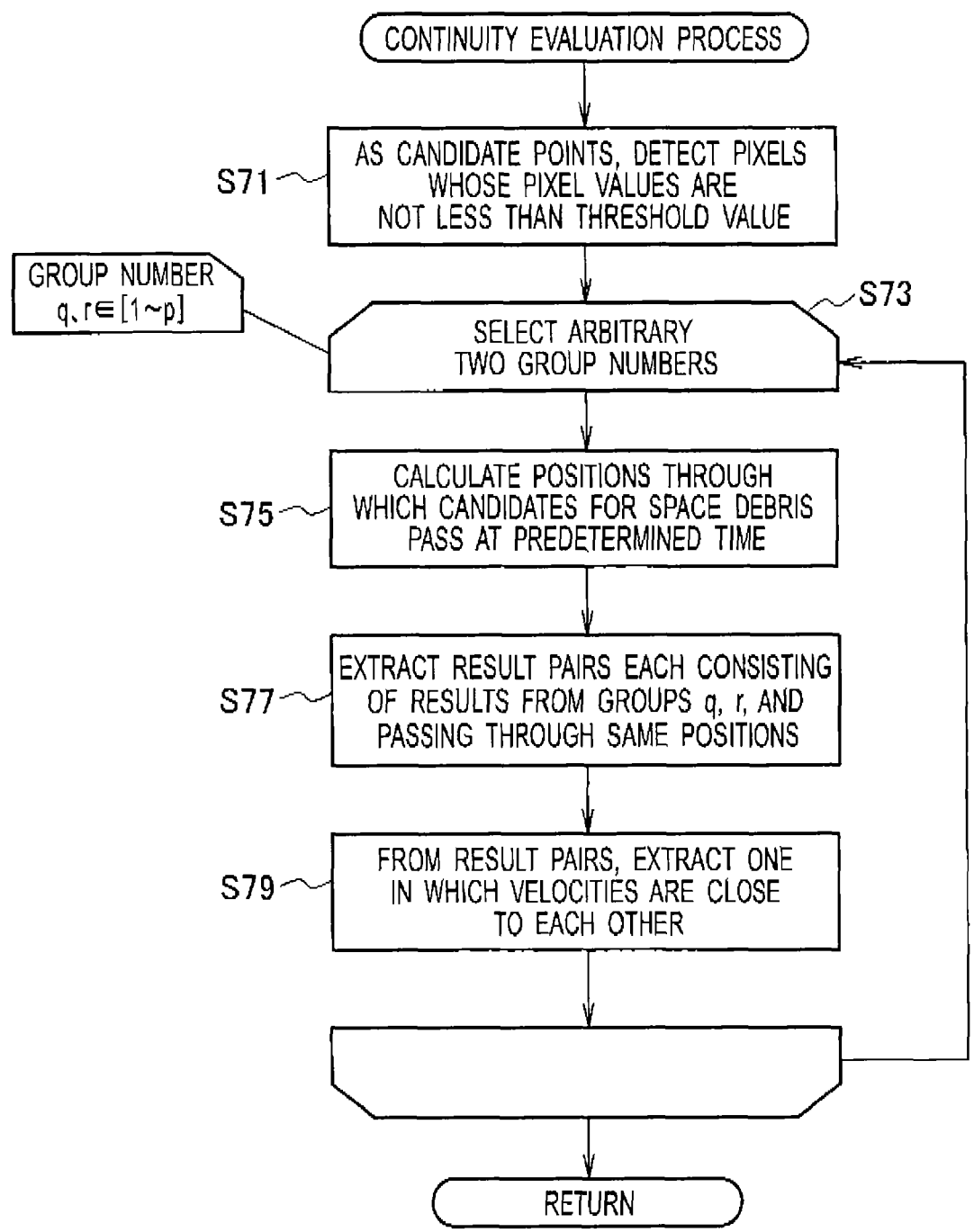
FIG. 6 is a flowchart showing a concrete procedure for a continuity evaluation process step in the flowchart shown in FIG. 1.

Thereafter, a judgment is made on whether any one of the following criteria is met: a criterion that the average pixel value at the candidate point for the space debris obtained as a result of the stacking process is equal to or less than the threshold value (the candidate criterion value, corresponding to the criterion value in the CLAIMS) required for the candidate point to be selected as a candidate for the space debris, which is used in the process of step S71 in FIG. 6; a criterion that the pixel values of a majority of the adjacent pixels are equal to or less than the average pixel value; and a criterion that the pixel values of a majority of the adjacent pixels are less than 70% of the threshold value. If one of the criteria is met (if YES in step S97), the process returns to step S93.

On the other hand, if none of the criteria is met, i.e., if the average pixel value at the candidate point for the space debris is greater than the threshold value (the candidate criterion value, corresponding to the criterion value in the CLAIMS) required for the candidate point to be selected as a candidate for the space debris and if the majority of the adjacent pixels fall outside the above-mentioned criteria (if NO in step S97), what is captured at the candidate point is detected as apart of the space debris represented by the pixel at the candidate point and its adjacent pixels having similar pixel values, and which takes on a circular or elliptical shape as a whole. Then, the result of the detection is stored together with the images used in the stacking process in step S95 (step S99).

The embodiment has described that both the brightness at the candidate point and the brightness of its adjacent pixels are used as the criteria for making the judgment on the space debris. It should be noted, however, that the judgment maybe made on the space debris based on either brightness.

Once the processes from step S93 through step S99 are completed on all the final candidates for the space debris, the result Check process step (step S9 in FIG. 1) is terminated.

As is clear from the foregoing descriptions, the embodiment makes step S81 in FIG. 4 correspond to an average-value-of-limited-pixels calculating step in the CLAIMS. In addition, the embodiment makes step S71 in FIG. 6 correspond to a judgment step in the CLAIMS.

Furthermore, the embodiment makes step S57 in FIG. 4 correspond to an average-value-of-all-pixels calculating step in the CLAIMS. In addition, the embodiment makes step S59 in FIG. 4 correspond to a threshold value calculating step in the CLAIMS.

Moreover, the embodiment makes step S51 in FIG. 4 correspond to a grouping step in the CLAIMS. In addition, the embodiment makes steps S7, S9 in the flowchart of FIG. 1 correspond to a detection step in the CLAIMS.

Further, the embodiment makes the noise component correction process performed in step S31 in FIG. 3 for removing the "noise component attributed to the star" correspond to a filtering step in the CLAIMS.

The space debris detection method of the embodiment, which follows the foregoing procedures, includes the stacking process step to be performed in step S5 in FIG. 1 using the stacking method, in which as the evaluation value for detecting the space debris, the average value of the pixel values, instead of the median value of the pixel values, is evaluated from the pixel values at the same pixel positions overlapping one another across the superposed m images.

In this respect, let us assume that: the estimated moving velocity V of the space debris (the distance that the space debris moves in a time period corresponding to the overlaps) is given by $V=(\pm Vx, \pm Vy)$ the image size L is given by $L=(Lx, Ly)$; the estimated velocity V and the image size L are given by $Vx=Vy=200$ (i.e., $V=(\pm 200, \pm 200)$) and $Lx=Ly=2000$, respectively; and the number of images to be used for the detection is given by $n=32$.

When the distance that the space debris moves in the time period corresponding to the overlaps is calculated by changing and superposing the pixels on a one-to-one basis, $(\pm Vx) \times (\pm Vy)$ moving velocities V can be estimated for the moving object. As a result, when evaluating the pixel values of the respective $(Lx \times Ly)$ pixels for all the estimated velocities for the n images, the number of needed operation processes amounts to $$(2Vx) \times (2Vy) \times (Lx) \times (Ly) \times n$$

$$=400 \times 400 \times 2000 \times 2000 \times 32 = 2.0 \times 10^{13}.$$

Furthermore, as previously discussed, the evaluating of the median values of the pixel values requires $$n \log (n)$$

comparison processes and assignment operations to be performed. In contrast, 2n addition processes and n comparison processes are enough to evaluate the average values of the pixel values.

The calculation of the average values which can be achieved by performing $2n+n$ ($=3n$) operation processes in total requires a far smaller amount of operations than the calculation of the median values which needs $n\log(n)$ comparison processes and $1.5 \times n\log(n)$ assignment operations, where the amount of assignment operations is 1.5 ($3 \times 50\%$) times as large as the amount of comparison processes.

Furthermore, when the processor performs a speculative execution in the course of the 3n operation processes, the probability that the speculative execution succeeds in processing the same option in succession is approximately 96.1% which is given by $(98\% \times 98\%)+(2\% \times 2\%)$, because the probability that pixels capturing a star or the like, a moving object which is not the space debris, exist in the images is approximately 2%. In other words, the probability that the speculative execution ends in failure is approximately 3.9%, and is far lower than the probability that the value sorting processes (three assignment operations) are performed after the $n\log(n)$ comparison processes, i.e., a 50% probability that the speculative execution ends in failure as a result of no repetition of the same operation.

Moreover, in the space debris detection method of the embodiment, the threshold value obtained by multiplying the average value of the pixel values at the same pixel positions across the superposed images by the predetermined number (two, for example) is used to distinguish the space debris from an object which emits light at a higher luminance than the space debris (corresponding to the high-luminance light emitting element in the CLAIMS).

For this reason, the average pixel value reflects less of the luminance (pixel value) of the high-luminance light emitting element (noise component), such as a star or a cosmic ray in the celestial sky captured in pixels, than the average value evaluated by simply averaging the pixel values at the same pixel positions across the superposed images. In other words, the average value evaluated by averaging only the pixel values which are equal to or less than the threshold value obtained by multiplying the average value of the pixel values at the same pixel positions across the superposed images by the predetermined number (two, for example) is closer to the luminance (pixel value) of the space debris than is the average pixel value obtained by simply averaging the pixel values at the same pixel positions across the superposed images.

Accordingly, when the space debris is detected using the stacking method, the employment of the average value of the pixel values equal to or less than the threshold value as the evaluation value for the space debris detection makes it possible to accurately detect a candidate for a pixel capturing the space debris, and consequently the space debris itself, with less operation processes than required when the median value evaluated from the pixel values at the same pixel positions across the superposed images is used as the evaluation value for the space debris.

The above-mentioned threshold value, however, may be determined independently of the average value of the pixel values at the same pixel positions across the superposed images.

Referring to graphs shown in FIGS. 9 to 11, a noise component in an image signal will be hereinbelow compared between a case where the evaluation value for the space debris detection is the evaluation value used in the detection method of the embodiment and a case where the evaluation value for the space debris detection is the average value or the median value of the pixel values at the same pixel positions across the superposed images.

Figure 9:
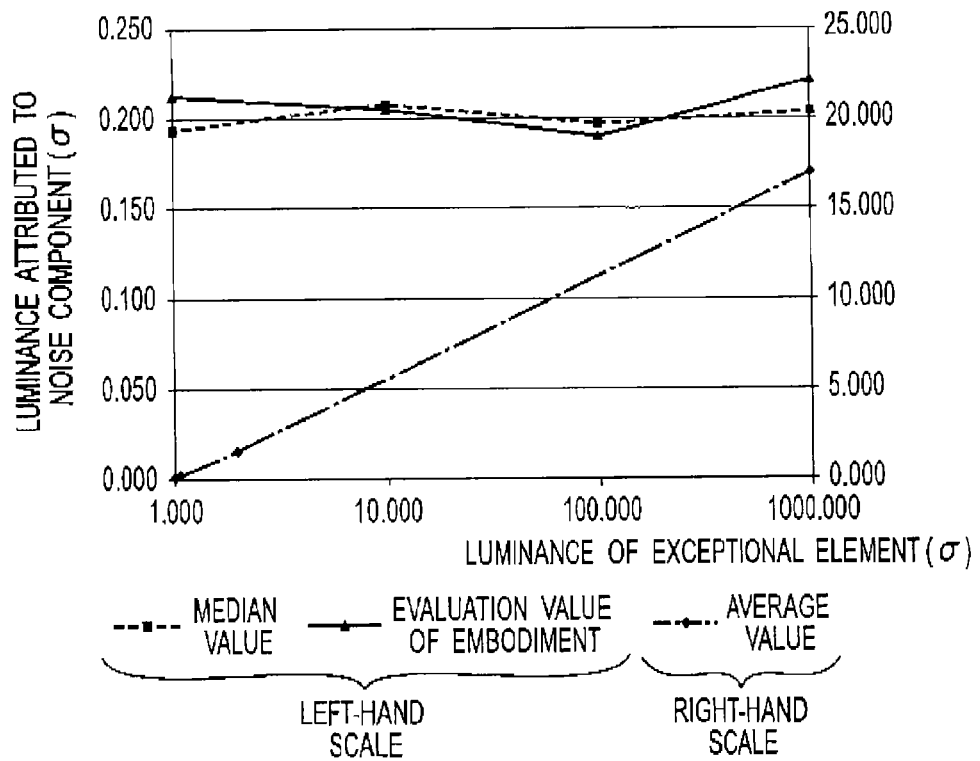
FIG. 9 is a graph showing a noise component remaining in an image signal in accordance with a change in the luminance of an exceptional element, such as a star, captured in images by comparing the noise component among the evaluation values used for the space debris detection.

FIG. 9 is a graph showing a noise component remaining in an image signal in accordance with a change in the luminance of an exceptional element, such as a star, captured in images by comparing the noise component among the evaluation values used for the space debris detection. This graph shows how the noise component changes in accordance with a change in the luminance of the exceptional element in a range of 1σ to 1000σ when: the number of superposed images is 40; the frequency (probability) of the occurrence of the exceptional element is 2%; and the offset component of the CCD element in the photographing apparatus is 1σ.

It should be noted that: the horizontal axis in FIG. 9 represents the range of the luminance of the exceptional element; and the vertical axis in FIG. 9 represents a ratio of a RMSE (Root Mean Squared Error) after the processes, i.e., a square root of the noise component, or in other words, σ of the original signal (error variance=RMSE). Furthermore, noise components corresponding to the median value and the evaluation value of the embodiment respectively indicated with a thin line and a thick line in the graph read on the scale along the left-hand vertical axis. In addition, the noise component corresponding to the average value indicated with a dashed line reads on the scale along the right-hand vertical axis.

In the case where the evaluation value for the space debris is the median value, and in the case where the evaluation value for the space debris detection is the evaluation value of the embodiment, only the noise component of approximately 0.2σ exists in the image signal no matter how high or low the luminance range of the exceptional element is. In contrast to this, in the case where the evaluation value for the space debris is the average value, the noise component in the image signal increases in proportion with an increase in the luminance range of the exceptional element. Particularly, when the luminance of the exceptional element rises to 1000σ, the noise component which is approximately 1000 times as large as the noise components corresponding to the median value and the evaluation value of the embodiment becomes present in the image signal.

Accordingly, it can be learned from the graph shown in FIG. 9 that the evaluation value of the embodiment makes it possible to detect the space debris with as much accuracy as the median value used as the evaluation value for the space debris detection, and makes it possible to detect the space debris with far higher accuracy than the average value used as the evaluation value for the space debris detection.

Figure 10:
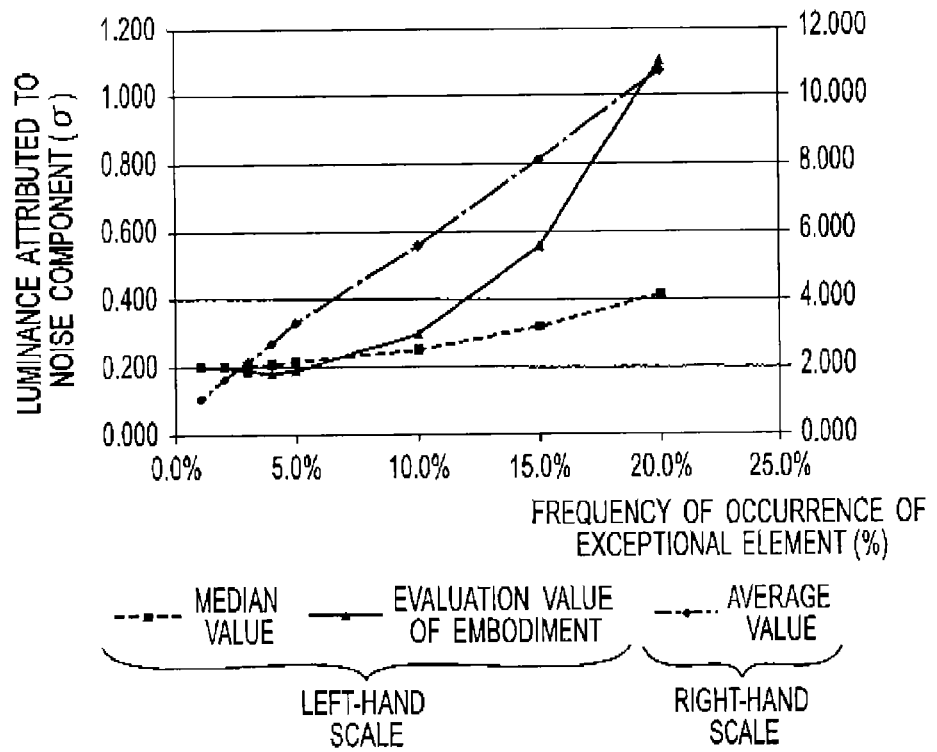
FIG. 10 is a graph showing a noise component remaining in an image signal in accordance with a change in the frequency of the occurrence of an exceptional element, such as a star, captured in images by comparing the noise component among the evaluation values used for the space debris detection.

Next, FIG. 10 is a graph showing a noise component remaining in an image signal in accordance with a change in the frequency of the occurrence of an exceptional element, such as a star, captured in images by comparing the noise component among the evaluation values used for the space debris detection. This graph shows how the noise component changes in accordance with a change in the frequency (probability) of the occurrence of the exceptional element in a range of 1.0% to 25.0% when: the number of superposed images is 40; the offset component of the CCD element in the photographing apparatus is 1σ; and the luminance range of the exceptional element, such as a star, captured in the images is 100σ.

It should be noted that: the horizontal axis in FIG. 10 represents the frequency of the occurrence of the exceptional element; and the vertical axis in FIG. 10 represents a ratio of a RMSE (Root Mean Squared Error) after the processes, i.e., a square root of the noise component, or in other words, σ of the original signal (error variance=RMSE). Furthermore, noise components corresponding to the median value and the evaluation value of the embodiment respectively indicated with a thin line and a thick line in the graph read on the scale along the left-hand vertical axis. In addition, the noise component corresponding to the average value indicated with a dashed line reads on the scale along the right-hand vertical axis.

In the case where the evaluation value for the space debris is the evaluation value of the embodiment, while the frequency of the occurrence of the exceptional element is in a range equal to or less than 6% to 7%, the noise component in the image signal is as small as or equal to or less than the noise component corresponding to the median value used as the evaluation value for the space debris. However, when the frequency of the occurrence of the exceptional element exceeds 6% to 7%, the noise component becomes higher than the noise component corresponding to the median value used as the evaluation value for the space debris.

Furthermore, in the case where the evaluation value for the space debris is the evaluation value of the embodiment, the noise component in the image signal is far lower than the noise component corresponding to the average value used as the evaluation value for the space debris no matter how high or low the frequency of the occurrence is.

In this respect, the accuracy in the space debris detection is most affected by the existence of a star, and the probability that the star is captured in the captured images is approximately 2%. With these facts taken into consideration, it can be learned that the evaluation value of the embodiment makes it possible to detect the space debris with as much accuracy as, or with higher accuracy than, the median value used as the evaluation value for the space debris detection, and makes it possible to detect the space debris with far higher accuracy than the average value used as the evaluation value for the space debris detection.

Figure 11:
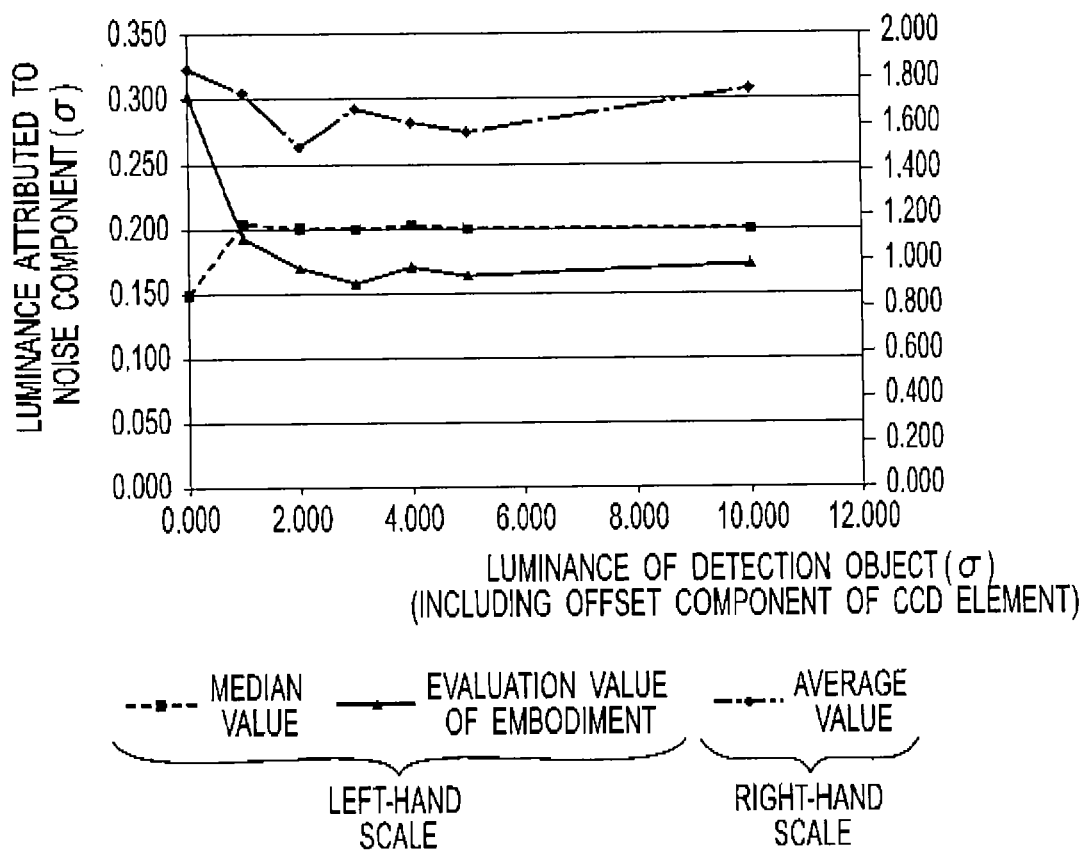
FIG. 11 is a graph showing a noise component remaining in an image signal in accordance with a change in the brightness of a detection object including the offset component of a CCD element in a photographing apparatus by comparing the noise component among the evaluation values used for the space debris detection.

Next, FIG. 11 is a graph showing a noise component remaining in an image signal in accordance with a change in the brightness of a detection object including the offset component of the CCD element in the photographing apparatus by comparing the noise component among the evaluation values used for the space debris detection. This graph shows how the noise component changes in accordance with a change in the brightness of the detection object including the offset component of the CCD element in a range of 0.0σ to 12.0σ when: the number of superposed images is 40; the frequency (probability) of the occurrence of the exceptional element, such as a star, captured in the images is 2%; and the luminance range of the exceptional element is 100σ.

It should be noted that: the horizontal axis in FIG. 11 represents the brightness of the detection object including the offset component of the CCD element in the photographing apparatus; and the vertical axis in FIG. 11 represents a ratio of a RMSE (Root Mean Squared Error) after the processes, i.e., a square root of the noise component, or in other words, σ of the original signal (error variance=RMSE). Furthermore, noise components corresponding to the median value and the evaluation value of the embodiment respectively indicated with a thin line and a thick line in the graph read on the scale along the left-hand vertical axis. In addition, the noise component corresponding to the average value indicated with a dashed line reads on the scale along the right-hand vertical axis.

In the case where the evaluation value for the space debris is the evaluation value of the embodiment, while the brightness of the detection object including the offset component of the CCD element is in a range equal to or greater than approximately 1σ, the noise component in the image signal is less than the noise component corresponding to the median value used as the evaluation value for the space debris.

Furthermore, in the case where the evaluation value for the space debris is the evaluation value of the embodiment, the noise component in the image signal is far lower than the noise component corresponding to the average value used as the evaluation value for the space debris no matter high or low the brightness of the detection object including the offset component of the CCD element is.

For this reason, it can be learned that when the luminance of the space debris is equal to or greater than approximately 1a, the employment of the evaluation value of the embodiment makes it possible to detect the space debris with as much accuracy as, or with higher accuracy than, the use of the median value as the evaluation value for the space debris detection, and makes it possible to detect the space debris with far higher accuracy than the use of the average value as the evaluation value for the space debris detection.

In the embodiment, the images captured by the photographing apparatus (not illustrated) are divided into the p groups each including the m images, and the stacking process step (step S5 in FIG. 1) is performed on each group. However, the stacking process step (step S5 in FIG. 1) may be performed on all the captured images in batch at one time without dividing the images into the groups.

In this case, the stacking process step may be achieved in a way that: the continuity evaluation process step shown in the flowcharts of FIGS. 1 and 6 is omitted; and in the result check process step in FIG. 8, the pixels having the largest pixel value under the estimated moving velocity V, selected in step S63 of FIG. 4, and the largest pixel value are used in lieu of the pixels calculated in step S79 of FIG. 6 as the final candidates for the space debris, and their luminance C.

Nevertheless, when like in the embodiment, the captured images are divided into the p groups and the stacking process step is performed on each group, the judgment on whether or not the candidates for the space debris detected from each group are continuous to one another in terms of the movement direction, moving velocity and moving position can be added to the judgment on the space debris. Thereby, the space debris can be accurately detected even though the average pixel value requiring the less operation processes is used as the evaluation value for the space debris detection.

Furthermore, the technique of removing the noise component attributed to the star, which has been explained as a part of the correction to be made by removing the noise components in step S21 of FIG. 3 can be applied to a moving object other than the space debris, a non-star moving object which is not the detection object, and can be used as a technique of removing a noise component in captured images into which the moving object is captured. However, since each two successive captured images are superposed in accordance with the relative movement, the contents of the movement of the moving object (i.e. motion parameters) during each photographing interval (for example, the direction and amount of movement of the moving object in a case where the moving object is in uniform linear motion) need to be known in advance.

In addition, the foregoing descriptions have been provided for the embodiment in which the present invention is carried out as the space debris detection method. Nevertheless, the present invention is broadly applicable to the detection of a moving object other than the space debris from images captured inconstant intervals using the stacking method, for example, the identification and detection of an object other than the space debris, such as an artificial satellite orbiting the earth, or colored microbes, on captured images.

Furthermore, the foregoing descriptions have been provided for the embodiment, citing the stacking method to be performed on the moving object, the observation object, in uniform linear motion in the estimated movement direction and with the estimated movement amount. Nevertheless, the present invention is applicable, as well, to a stacking method to be performed on a moving object, an observation object, in uniform acceleration (parabolic) motion with an estimated movement amount which increases or decreases by a constant amount over time.

In the embodiment, the average value calculated in the average-value-of-limited-pixels calculating step is the average value of the pixel values at the same pixel positions across the images, excluding a pixel value corresponding to the high-luminance light emitting element whose luminance (pixel value) is greatly higher than the luminance (pixel value) of the moving object, the observation object, on the images. For this reason, the average value calculated in the average-value-of-limited-pixels calculating step is the average pixel value which reflects less of the luminance (pixel value) of the high-luminance light emitting element (noise component), such as a star or a cosmic ray in the celestial sky captured in pixels, than the average value evaluated by simply averaging the pixel values at the same pixel positions across the images. In other words, the average pixel value calculated in the average-value-of-limited-pixels calculating step is closer to the luminance (pixel value) of the moving object, the observation object, than is the average pixel value obtained by simply averaging the pixel values at the same pixel positions across the superposed images.

Moreover, in order to calculate the average pixel value, the processor performs either a speculative execution of "performing an addition operation for the purpose of calculating an average value" or a speculative execution of "not performing an addition operation for the purpose of calculating an average value" on the pixel values at the Same pixel positions across the images. As long as the proportion of the existence of the high-luminance light emitting element in each image is not so high that many of the pixels in the image display the high-luminance light emitting element, the speculative execution to be performed by the processor is the speculative execution of "performing an addition operation for the purpose of calculating an average value" by a probability of sufficiently higher than 50%, and succeeds by a probability of sufficiently higher than 50%.

For this reason, the influence of an increase in the amount of operation processes as a result of the failure in the speculative execution is small.

Accordingly, when the moving object is detected using the stacking method, the employment of the average pixel value calculated in the average-value-of-limited-pixels calculating step as the evaluation value for the moving object detection makes it possible to accurately detect a pixel capturing the moving object, the observation object, or the candidate therefore with less operation processes than required when the median value evaluated from the pixel values at the same pixel positions across the superposed images is used as the evaluation value for the moving object.

What value the threshold value for distinguishing the moving object, the observation object, from the high-luminance light emitting element should be set at is a very important parameter for the average value calculated in the average-value-of-limited-pixels calculating step to reflect less of the luminance (pixel value) of the high-luminance light emitting element whose luminance (pixel value) greatly differs from the luminance of the moving object, the observation object.

For this reason, the threshold value is set based on the average value of all the pixel values at the same pixel positions across the superposed images (by multiplying the average value of all the pixel values by the predetermined number). The employment of the threshold value as a criterion for the luminance (pixel value) of the moving object, the observation object, makes it possible to accurately distinguish a pixel whose luminance (pixel value) greatly differs from the criterion luminance (pixel value), as a pixel representing the existence of the high-luminance light emitting element, from a pixel representing the existence of the moving object, the observation object.

Moreover, the images captured in constant intervals are divided into the groups each including the predetermined number of successive images in time series. If candidates for the moving object, the observation object, judged in the images in each group coincide with one another in terms of the estimated movement contents (estimated motion parameters) and movement locus, the candidates are judged as representing the same moving object. Thereby, the moving object, the observation object, is finally recognized and detected.

Even though, therefore, the evaluation value for the moving object detection obtained from the pixel values at the same pixel positions across the superposed images is replaced with the average value requiring less operation processes than the median value, the moving object, the observation object, or candidates therefore can be accurately detected by checking whether or not the candidates for the moving object, the observation object, judged in the respective groups coincide one another in terms of the estimated movement contents (estimated motion parameters) and movement locus (the movement direction).

In the embodiment, if a moving object different from the moving object, the observation object, is captured in the images, and if the movement contents (motion parameters) of the different moving object during constant intervals are known in advance, the pixel values are filtered in the filtering step, and thereby pixel values attributed to the movement of the different moving object are cancelled in the images. The use of the resultant images makes it possible to accurately detect the moving object, the observation object, or candidates therefore.

Furthermore, even if a star, a cosmic ray and the like are captured in the images at higher luminance than the object orbiting the earth which is the moving object as the observation object, the embodiment makes it possible to accurately detect the object orbiting the earth from the images with the less operation processes.

In sum, when the moving object is detected using the stacking method, the embodiment makes it possible to accurately detect the moving object or candidates therefore with less operation processes than required when the median value obtained from the pixel values at the same pixel positions across the superposed images is used as the evaluation value for the moving object detection.

What is claimed is:

1. A method for detecting a moving object being an observation object from images captured in constant intervals, based on an evaluation value obtained from pixel values at the same pixel positions overlapping one another across the images by sequentially moving the images in accordance with a content corresponding to an estimated movement content of the moving object being the observation object during the constant intervals, comprising:
   an average-value-of-limited-pixels calculating step of calculating an average value using pixel values which are equal to or less than a threshold value for distinguishing the moving object being the observation object from a light emitting element with a higher luminance than that of the moving object, the pixel values being among the pixel values at the same pixel positions across the images; and
   a judgment step of judging pixels at the same pixel positions across images, whose average values calculated in the average-value-of-limited-pixels calculating step are equal to or greater than a criterion value, as pixels capturing the moving object being the observation object, or capturing candidates for the moving object.

2. The method according to claim 1, further comprising:
   an average-value-of-all-pixels calculating step of calculating an average value of all the pixel values at the same pixel positions across the images; and
   a threshold value calculating step of calculating the threshold value by multiplying the average value calculated in the average-value-of-all-pixels calculating step by a predetermined number.

3. The method according to claim 1, wherein
   the estimated movement content is uniform linear motion of the moving object being the observation object in an estimated movement direction thereof and with an estimated movement amount thereof, and
   the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

4. The method according to claim 2, wherein
   the estimated movement content is uniform linear motion of the moving object being the observation object in an estimated movement direction thereof and with an estimated movement amount thereof, and
   the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

5. The method according to claim 1, wherein
the estimated movement content is uniform acceleration motion of the moving object being the observation object in an estimated movement direction thereof and with an estimated movement amount thereof which increases or decreases by a constant amount over time, and
the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

6. The method according to claim 2, wherein
the estimated movement content is uniform acceleration motion of the moving object being the observation object in an estimated movement direction thereof and with an estimated movement amount thereof which increases or decreases by a constant amount over time, and
the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

7. The method according to claim 1, further comprising:
a grouping step of dividing the images into groups each including a predetermined number of successive images in time series; and
a detection step of detecting the moving object being the observation object in the images based on a result of the judgment in the judgment step, wherein
for each of the groups into which the images are divided in the grouping step, the average-value-of-limited-pixels calculating step and the judgment step are performed using the predetermined number of images belonging to the group, and
if the candidates coinciding with one another in terms of the estimated movement content and movement locus are extracted from the groups, the detection step detects the candidates as the moving object being the observation object in the images.

8. The method according to claim 1,
further comprising a filtering step of: moving one image of the images, and another image captured before or after the one image in one of the constant intervals, in accordance with a content corresponding to an already-known movement content of a moving object, which is different from the observation object, during the constant intervals; subtracting pixel values at the same pixel positions in the other image overlapping the one image from pixel values of the pixels in the one image; and thereby calculating post-filtering pixel values for the pixels in the one image, wherein
the average-value-of-limited-pixels calculating step calculates an average value of pixel values equal to or less than the threshold value, the pixel values being among the post-filtering pixel values at the same pixel positions across the images obtained in the filtering step.

9. The method according to claim 1, wherein
the moving object being the observation object is an object orbiting the earth, and
the images are images captured in intervals during fixed-point observation.

* * * * *